2 Sheets—Sheet 1.
G. W. PARSONS.
Canal Lock and Dam.
No. 9,345. Reissued Aug. 17, 1880.
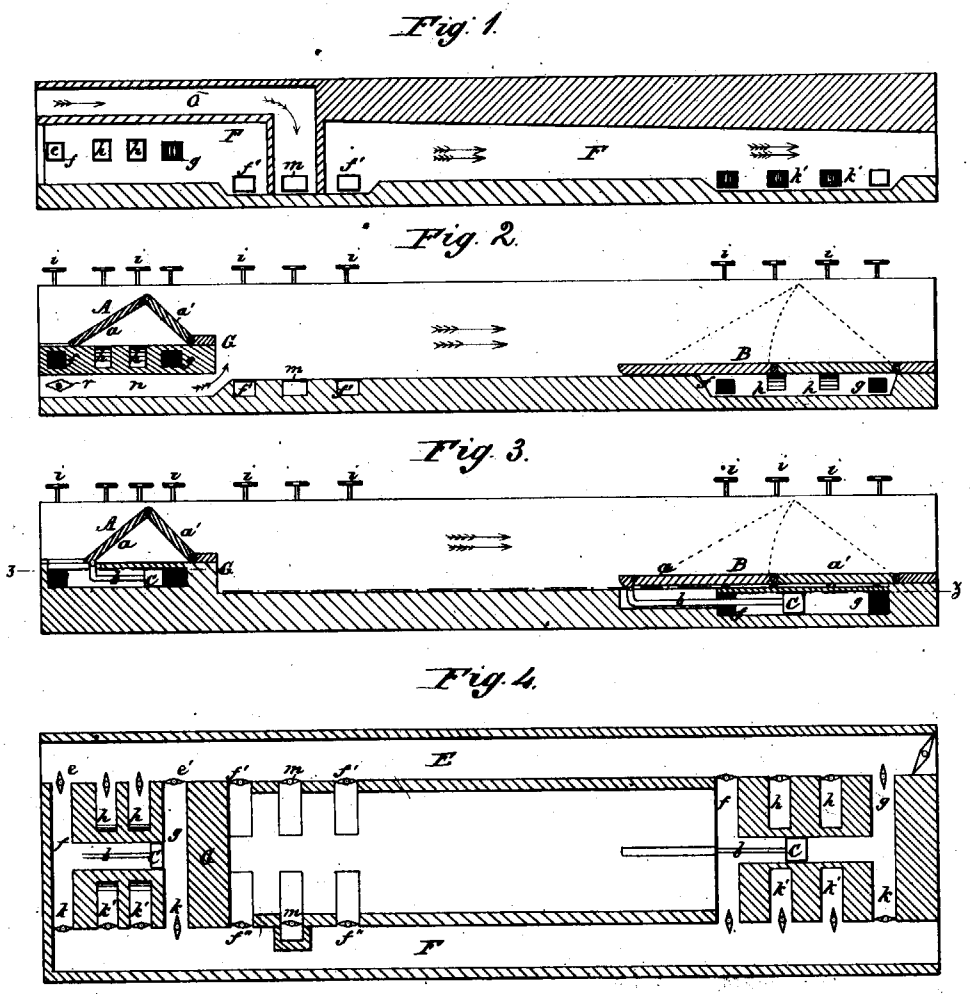
WITNESSES:
W. W. Hollingsworth
Amos W. Hart
INVENTOR:
Geo. W. Parsons
BY Munn & Co.
ATTORNEYS.
N. PETERS, PHOTO-LITHOGRAPHER, WASHINGTON, D. C.

G. W. PARSONS.

Canal Lock and Dam.

No. 9,345. Reissued Aug. 17, 1880.

WITNESSES:

W. W. Hollingsworth

Amos W. Hart

INVENTOR:

Geo. W. Parsons

BY Munn & Co

ATTORNEYS.

N. PETERS, PHOTO-LITHOGRAPHER, WASHINGTON, D. C.

UNITED STATES PATENT OFFICE.

GEORGE W. PARSONS, OF CEREDO, WEST VIRGINIA.

CANAL-LOCK AND DAM.

SPECIFICATION forming part of Reissued Letters Patent No. 9,345, dated August 17, 1880.

Original No. 180,056, dated July 18, 1876. Application for reissue filed May 29, 1879.

*To all whom it may concern:*

Be it known that I, GEORGE W. PARSONS, of Ceredo, in the county of Wayne and State of West Virginia, have invented a new and Improved Adjustable Lock Dam and Chute; and I do hereby declare that the following is a full, clear, and exact description of the same.

The chief object of my invention is to enable boats to be passed from one level to another, either in canals or rivers, more quickly and with less labor than by means of the locks heretofore used. To this end the invention is twofold. It relates, first, to a lock proper, and, secondly, to the dam or chute.

For locking purposes I employ vertically-acting hinged gates operated by sliding pistons. For operating the pistons I may utilize the head of water above the lock or chute, the water being allowed to act on one or the other side of the pistons, according as it is desired to raise or lower the gates. The admission of the water is controlled by adjustable valves or wickets. It is hence obvious that the labor and time involved in the operation are reduced almost to a minimum. In respect to the chute, I break up the ridge or column of water which forms at the bottom of every fall by allowing a portion of the water which would otherwise pass over the fall to pass beneath or around it in one or more separate streams and enter or rejoin the main body below the bulk-head. An inclined water-plane or body of comparatively smooth water will thus be formed to float the boat safely over the dam or bulk-head.

Figure 5:
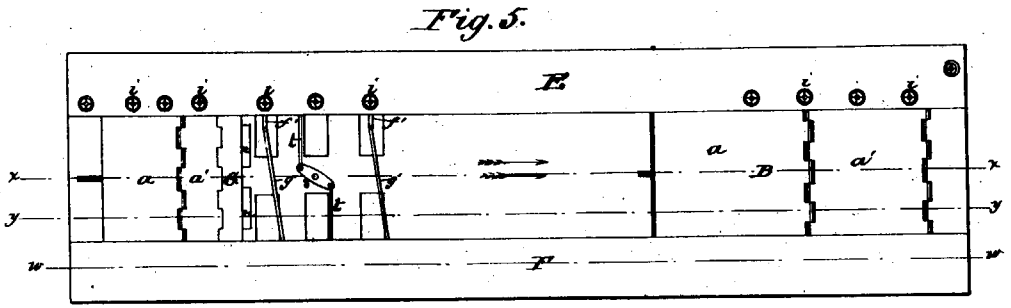
Figure 6:
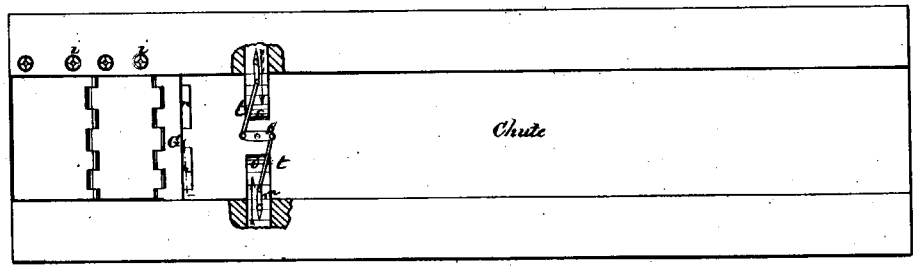
Figure 7:
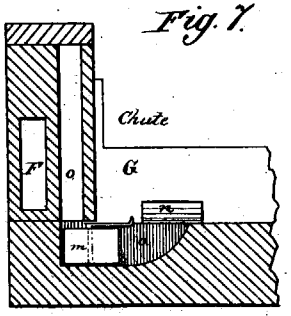

In the accompanying drawings, Figure 1 is a sectional elevation of my improved dam and chute on line *w w* of Fig. 5; Fig. 2, a like section on line *y y*, Fig. 5; Fig. 3, a sectional elevation on line *x x*, Fig. 5; Fig. 4, a horizontal section on line *z z*, Fig. 3. Fig. 5 is a plan view of the lock. Fig. 6 is a plan view, with part in section, of the chute proper. Fig. 7 is a cross-section of the same on line *x x* of Fig. 6.

The lock is designed for use mainly for the purposes of slack-water navigation, but is applicable also for boat and ship canals proper. In some cases the bulk-head, which forms part of the lock or chute proper, will form part of a dam extended completely across a stream or river.

In the drawings, the double arrows indicate the direction of the natural flow of water in the canal or river. I show in Figs. 2, 3, 5 the gates by which the lock is formed. The smaller gate, A, is located upon the upper level, and the larger gate, B, upon the lower level. In other words, the smaller gate is hinged to the bulk-head and the larger to the bottom of the lock proper. Each of them is composed of two plates, *a a'*, hinged together transversely of the lock. The part *a'* is hinged at the bottom of the lock, and the end of the other part, *a*, is hinged to the rods *b* of pistons C, which work horizontally in cylinders arranged immediately beneath the gate. The piston-rods are curved or bent at one end to adapt them to work in a lengthwise slot in the lock-bed, as shown.

It is evident that if the water be admitted to press on the upper side of the pistons they will be moved to the opposite end of the cylinders and thereby raise the gates, the respective parts *a a'* in such case assuming the position indicated in full lines in Figs. 2, 3, 5—to wit, at an angle of about forty-five degrees to each other—and contrariwise the action of the water on the lower side of the pistons will lower the gates.

The water is admitted through passages *f* to the piston-cylinders by means of valves or wickets *e*, Fig. 4, so as to act on the upper (or upstream) side of the pistons C, and to the lower ends of the cylinders on the lower side of the pistons C, through passages *g*, which have wickets *e'*.

Both passages *f* and *g* communicate with the main passage E in the side of the lock and opening on the upper level. This main passage extends the whole length of the lock, and is closed at its lower end by a wicket, which may be opened, when required, to clear the passage of sand or other accumulation.

To buoy the gates and assist in raising them or holding them raised, I may, when necessary, admit water beneath them through passages *h* in the side of the lock, Figs. 1, 2, 4. These passages are provided with wickets in like manner with those by which water is admitted to the pistons C.

All the wickets above mentioned are operated by rods *i*, which extend above the lock, and are provided with hand-wheels for convenience of adjusting them. The water thus admitted into the piston-cylinders is allowed to escape through passages *k*, Fig. 4, on the opposite side of the lock from which it enters. The water admitted through passages *h* for the purpose of assisting in raising the gates finds exit through passages *k'*.

All the eduction-passages *k k'* communicate with the main passage F on the right-hand side of the lock, Figs. 1, 4.

The wickets *f'* on the left-hand side of the lock-chamber, Fig. 4, are employed to aid in admitting water to, and thus filling, the lock, and the wickets *f''* on the opposite side of the lock aid in discharging the water from said chamber. The wickets *f' f''* are connected in pairs by rods *g'*, Fig. 5, so that when those, *f'*, on one side of the lock are open the others, *f''*, are closed.

It is apparent that when a boat is to be conveyed from the upper to the lower level the lower gate, B, is raised in the manner above described, and, the lock having become filled, the boat draws in in the usual way. The small or upper gate, A, is then raised and the wickets *f''* are opened, which is to allow the water to discharge from the chamber. The gate B may also be lowered for the same purpose.

By the above-described plan of constructing locks and operating the gates I am enabled to pass a boat from one level to another in about one-third the time required in the common lock, and with very little labor on the part of the lock-tenders.

In forming the chute (to which I have referred at the outset) the lower gate is dispensed with and the upper gate will be seldom used. Normally the water passing over the bulk-head forms a "breaker" below it, and has also a greater or less velocity, dependent on the head.

The specific objects to be attained in order to form a chute of the desired character are to destroy the breaker or prevent its formation and to retard the velocity of the current. To do this I admit lateral currents through openings below the bulk-head in the side walls, E F, and currents may also be admitted through the passages *n* beneath the bulk-head. (See Figs. 1, 2, 6, 7.) These opposing currents break the force and continuity of the main current and cause the space below the bulk-head to be filled, so that the water passes through the chute with reduced velocity and forms a comparatively-smooth surface or inclined plane from the level above to the level below. The utility of this result in facilitating the passage of boats, &c., up or down through the chute is obvious.

To increase the effect on the main current I curve the discharge ends of the passages *n o* upward, Figs. 2 and 7, thus giving a corresponding upward tendency or direction to the opposing currents.

The passages *n* beneath the bulk-head are opened and closed by pivoted valves or wickets *r*, Fig. 2, operated by rods or other suitable devices, and the side passages, *o*, Fig. 1, by valves *m*. The valves *m* are connected by rods *t* and pivoted equalizing-lever *v*, Fig. 6. Thus both valves *m* are simultaneously opened and closed. The several pa sages *n o* are also available in the locking operation, serving to admit the water to the lock and enabling it to be filled very rapidly.

What I claim is—

1. The method herein described of raising and lowering the hinged lock or chute gate, which consists in directing a current from the body of water in which the gate is submerged upon an attachment of the latter, thus forcing it in one direction or the other, as specified.

2. In a lock or chute, the combination of the following elements, to wit: a gate hinged so as to be raised and lowered, to hinder or facilitate the flow of water, and a piston connected with said gate for operating it, as specified.

3. In a lock or chute, the combination, with the hinged two-part gate, the piston arranged to work horizontally in the bulk-head beneath the gate, the angular or bent rod passing through and reciprocating in a slot in the floor of the bulk-head and attached to the free upper end of the gate, as specified.

4. In a lock or chute, the combination, with the gates and pistons, of the wickets or valves located in the induction and eduction passages, and the rods connecting the same, whereby the wickets are alternately opened and closed, as set forth, for the purpose specified.

5. The method of breaking the fall and reducing the velocity of water passing over the bulk-head and causing the water to fill the space below the bulk-head, and thus forming an inclined plane of water from the level above to the level below, which consists in admitting into the space immediately below the bulk-head currents of water, which are conducted directly from the body of water above the bulk-head through separate passages in the sides or bottom of the lock, as shown and described.

6. The combination, with a bulk-head, of lateral passages or issues in the side walls below the bulk-head, for the purpose of allowing admission and escape of water, substantially as specified.

7. The combination, with a bulk-head, of a passage, *n*, or passages beneath the same, for the purpose of admitting a current or currents of water, as and for the purpose specified.

8. The passages for admitting water below or beneath the bulk-head, the same having an upward curvature at their discharge ends, for the purpose of giving an upward direction to the current or currents of water employed for destroying the breaker, as specified.

9. The combination, with the chute, of lateral passages, wickets *m*, rods *t*, and lever *s*, and rods and hand-wheels *i*, for operating the wickets simultaneously, as shown and described.

10. A lock or chute having side water channels or passages extending from end to end, one opening on the upper level and the other on the lower level, and a series of lateral passages having valves or wickets for admitting water from one channel or passage and allowing its escape into the other, as shown and described.

G. W. PARSONS.

Witnesses:
AMOS W. HART,
SOLON C. KEMON.